(12) United States Patent
Takezawa et al.

(10) Patent No.: US 6,733,927 B1
(45) Date of Patent: May 11, 2004

(54) NON-AQUEOUS ELECTROLYTE SECONDARY BATTERY AND METHOD FOR MANUFACTURING THE SAME

(75) Inventors: Hideharu Takezawa, Katano (JP); Yasuhiko Bito, Osaka (JP); Hiromu Matsuda, Hyogo (JP); Yoshinori Toyoguchi, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 167 days.

(21) Appl. No.: 09/762,220

(22) PCT Filed: Jun. 1, 2000

(86) PCT No.: PCT/JP00/03581

§ 371 (c)(1), (2), (4) Date: Mar. 23, 2001

(87) PCT Pub. No.: WO00/76016

PCT Pub. Date: Dec. 14, 2000

(30) Foreign Application Priority Data

Jun. 4, 1999 (JP) ............................. 11-158615

(51) Int. Cl.$^7$ ................................ H01M 6/14
(52) U.S. Cl. .................. 429/307; 429/231.95; 29/623.5
(58) Field of Search ............... 429/307, 231.1, 429/231.3, 231.95; 29/623.5

(56) References Cited

U.S. PATENT DOCUMENTS

| | | | |
|---|---|---|---|
| 5,691,084 A | * 11/1997 | Kita et al. ................. | 429/326 |
| 6,068,950 A | * 5/2000 | Gan et al. ................. | 429/231.9 |
| 6,203,942 B1 | * 3/2001 | Gan et al. ................. | 429/203 |

FOREIGN PATENT DOCUMENTS

| | | |
|---|---|---|
| EP | 0 917 224 A1 | 5/1999 |
| EP | 0 918 364 A1 | 5/1999 |
| JP | 4-184870 A | 7/1992 |
| JP | 08-111238 A | 4/1996 |
| JP | 08-273652 | 10/1996 |
| JP | 09-180721 A | 7/1997 |
| JP | 09-223516 A | * 8/1997 |
| JP | 10-055819 A | 2/1998 |
| JP | 10-255839 A | * 9/1998 |
| JP | 10-255839 A | 9/1998 |
| JP | 11-219711 A | 8/1999 |
| JP | 11-233140 A | 8/1999 |
| WO | WO 99/18621 | 4/1999 |

OTHER PUBLICATIONS

Electrolyte Datasheet [online]. Beijing Phylion Battery Co. Ltd.[retrieved on May 21, 2003]. Retrieved from the Internet <URL: www.fangxiang.com.cn/doce/cpjs_4.htm>.*

* cited by examiner

*Primary Examiner*—Susy Tsang-Foster
(74) *Attorney, Agent, or Firm*—Akin Gump Strauss Hauer & Feld, LLP

(57) ABSTRACT

In a non-aqueous electrolyte secondary battery, the reaction between the non-aqueous electrolyte and the electrode is suppressed to reduce a decrease in the discharge capacity with the charge/discharge cycle progress and the deterioration of battery characteristics during high-temperature storage. At least one of a chargeable and dischargeable positive electrode, a non-aqueous electrolyte containing a lithium salt, and a chargeable and dischargeable negative electrode in a non-aqueous electrolyte secondary battery contains at least one selected from the group consisting of a phosphate having three aliphatic hydrocarbon groups having 7 to 12 carbon atoms, a phosphate having two aliphatic hydrocarbon groups having 1 to 12 carbon atoms or an aromatic hydrocarbon group, and a phosphate having an aliphatic hydrocarbon group having 1 to 12 carbon atoms or an aromatic hydrocarbon group.

8 Claims, 1 Drawing Sheet

NON-AQUEOUS ELECTROLYTE SECONDARY BATTERY AND METHOD FOR MANUFACTURING THE SAME

TECHNICAL FIELD

The present invention relates to a non-aqueous electrolyte secondary battery with a high energy density, and to a method for producing the same.

BACKGROUND ART

A non-aqueous electrolyte secondary battery using an alkali metal such as lithium or sodium in the negative electrode has a high electromotive force. Furthermore, the battery has a higher energy density than conventional nickel-cadmium storage batteries and lead-acid storage batteries. Above all, various researches have been carried out about non-aqueous electrolyte secondary batteries using Li in the negative electrode. However, the use of an alkali metal for the negative electrode causes dendrite during charging. This is likely to cause a short circuit, thereby lowering the reliability of the battery.

Therefore, it has been tried to use an alloy of lithium and either aluminum or lead for the negative electrode. The use of the alloy among them for the negative electrode makes lithium be absorbed in the alloy in the negative electrode during charging. As a result, no dendrite occurs, making the battery highly reliable. However, the discharge potential of the alloy is about 0.5 V higher than metallic lithium. Therefore, the voltage of the battery is lowered by 0.5 V, and the energy density of the battery is also lowered.

On the other hand, there has been a study on a negative electrode containing a layered compound comprising a carbon material such as graphite and lithium as an active material. Batteries with this negative electrode have been in a practical use as lithium ion secondary batteries. In the layered compound, lithium is intercalated between the carbon layers by charging, so that no dendrite is caused. Furthermore, the negative electrode has a discharge potential only about 0.1 V higher than metallic lithium, which causes only a minor voltage drop of the battery. However, when the carbon material is graphite, the upper limit of the amount of lithium to be intercalated between the carbon layers by charging is theoretically one sixth of the number of carbon atoms. In that case, the electric capacity is 372 Ah/kg. Thus, carbon material having lower crystallinity than graphite, various alloys and metal oxides which have larger capacities than the above have been put fourth.

Moreover, as the non-aqueous electrolyte secondary batteries have higher capacity and higher performance, it has been suggested adding a phosphate to the non-aqueous electrolyte in order to mainly improve the flame resistance and reliability of the non-aqueous electrolyte secondary batteries (Japanese Laid-Open Patent Application Hei 4-184870, Japanese Laid-Open Patent Application Hei 8-111238, Japanese Laid-Open Patent Application Hei 9-180721, and Japanese Laid-Open Patent Application Hei 10-55819 for example). To be more specific, it has been suggested to make the non-aqueous electrolyte contain a large amount of phosphate which is obtained by substituting aliphatic hydrocarbon groups having 4 or fewer carbon atoms for three hydroxyl groups in the phosphate.

The appearance of the negative electrode active material with a high capacity has realized a non-aqueous electrolyte secondary battery having a large discharge capacity; however, it consequently causes the following problems.

That is, when capacity per unit weight or unit volume of the electrode increases, the non-aqueous electrolyte is decomposed on the electrode as the charge/discharge cycle proceeds, gradually lowering the discharge capacity. When a charged battery is stored at high temperatures, the non-aqueous electrolyte is decomposed or deteriorated on the electrode. As a result, the battery characteristics are impaired.

The present invention has an object of providing a non-aqueous electrolyte secondary battery in which a decrease in discharge capacity with the progress of a charge/discharge cycle and the deterioration of characteristics after the storage thereof at high temperatures are reduced by suppressing the reaction between the non-aqueous electrolyte and the electrode.

DISCLOSURE OF INVENTION

The present invention relates to a non-aqueous electrolyte secondary battery comprising a chargeable and dischargeable positive electrode, a non-aqueous electrolyte containing a lithium salt, and a chargeable and dischargeable negative electrode, wherein at least one of the positive electrode, the non-aqueous electrolyte and the negative electrode contains at least one selected from the group consisting of a phosphate represented by the general formula (1):

where $R^{1a}$, $R^{2a}$ and $R^{3a}$ independently represent an aliphatic hydrocarbon group having 7 to 12 carbon atoms, a phosphate represented by the general formula (2):

where $R^{1b}$ and $R^{2b}$ independently represent an aliphatic hydrocarbon group having 1 to 12 carbon atoms or an aromatic hydrocarbon group, and a phosphate represented by the general formula (3):

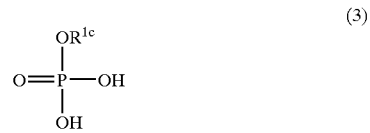

where $R^{1c}$ represents an aliphatic hydrocarbon group having 1 to 12 carbon atoms or an aromatic hydrocarbon group.

It is preferable that at least two selected from the group consisting of $R^{1a}$, $R^{2a}$ and $R^{3a}$ are identical with each other in the general formula (1), and/or $R^{1b}$ and $R^{2b}$ are identical with each other in the general formula (2).

The present invention also relates to a non-aqueous electrolyte secondary battery wherein at least one of the positive electrode, the non-aqueous electrolyte and the negative electrode contains a mixture of at least two selected from the group consisting of a phosphate represented by the general formula; (1), a phosphate represented by the general formula (2), and a phosphate represented by the general formula (3), where $R^{1a}$, $R^{2a}$, $R^{3a}$, $R^{1b}$, $R^{2b}$ and $R^{1c}$ in the general formulae (1) to (3) have the same number of carbon atoms, respectively.

It is preferable that the percentage by volume of each of the phosphates in the mixture is not less than 30%.

It is particularly preferable that the mixture of phosphates is a mixture of the phosphate represented by the general formula (2) and the phosphate represented by the general formula (3), where $R^{1b}$, $R^{2b}$ and $R^{1c}$ in the general formulae (2) and (3) have the same number of carbon atoms. It is also preferable that $R^{1b}$, $R^{2b}$ and $R^{1c}$ are of the identical group.

The present invention further relates to a non-aqueous electrolyte secondary battery, wherein at least one of the positive electrode, the non-aqueous electrolyte and the negative electrode contains at least one phosphate selected from the group consisting of dibutyl phosphate, dipentyl phosphate, dihexyl phosphate, diheptyl phosphate, dioctyl phosphate, dinonyl phosphate, didecyl phosphate, diundecyl phosphate, didodecyl phosphate, monobutyl phosphate, monopentyl phosphate, monohexyl phosphate, monoheptyl phosphate, monooctyl phosphate, mononyl phosphate, monodecyl phosphate, monoundecyl phosphate and monododecyl phosphate.

Above all, it is preferable that at least one of the positive electrode, the non-aqueous electrolyte and the negative electrode contains a mixture of at least one selected from the group consisting of dibutyl phosphate, dipentyl phosphate, dihexyl phosphate, diheptyl phosphate, dioctyl phosphate, dinonyl phosphate, didecyl phosphate, diundecyl phosphate, and didodecyl phosphate, and at least one selected from the group consisting of monobutyl phosphate, monopentyl phosphate, monohexyl phosphate, monoheptyl phosphate, monooctyl phosphate, mononyl phosphate, monodecyl phosphate, monoundecyl phosphate and monododecyl phosphate. In that case, it is preferable that the phosphates in the mixture have the same aliphatic hydrocarbon group, like a mixture of dibutyl phosphate and monobutyl phosphate.

It is preferable that the non-aqueous electrolyte contains 0.1 to 20 wt % of the phosphate.

It is also preferable that the chargeable and dischargeable positive electrode contains at least one selected from the group consisting of $LiCoO_2$, $LiMn_2O_4$, $LiNiO_2$ and $LiFeO_2$, and the chargeable and dischargeable negative electrode contains at least one selected from the group consisting of a carbon material, metallic lithium, a lithium alloy and a compound containing lithium. It is preferable that the lithium alloy contains at least one selected from the group consisting of Sn, Si, Al and In, besides lithium.

The present invention further relates to a method for producing a non-aqueous electrolyte secondary battery comprising the steps of: preparing an electrode mixture comprising an active material, a conductive agent and a binder, applying the electrode mixture on a current collector plate to prepare an electrode assembling a non-aqueous electrolyte secondary battery using the electrode and a non-aqueous electrolyte and, adding at least one of the active material, the electrode mixture and the electrode with at least one selected from the group consisting of a phosphate represented by the general formula (1):

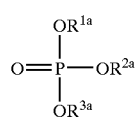

(1)

where $R^{1a}$, $R^{2a}$ and $R^{3a}$ independently represent an aliphatic hydrocarbon group having 7 to 12 carbon atoms, a phosphate represented by the general formula (2):

(2)

where $R^{1b}$ and $R^{2b}$ independently represent an aliphatic hydrocarbon group having 1 to 12 carbon atoms or an aromatic hydrocarbon group, and a phosphate represented by the general formula (3):

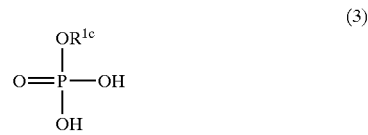

(3)

where $R^{1c}$ represents an aliphatic hydrocarbon group having 1 to 12 carbon atoms or an aromatic hydrocarbon group.

When the phosphate is added to the active material, the active material and the phosphate can be directly mixed, or the active material can be immersed in a solution containing the phosphate.

Furthermore, when the phosphate is added to the electrode mixture, the phosphate can be directly mixed with the electrode mixture.

Furthermore, when the phosphate is added to the electrode, the electrode may be immersed either in the phosphate or in a solution containing the phosphate.

BEST MODE FOR CARRYING OUT THE INVENTION

Figure 1:
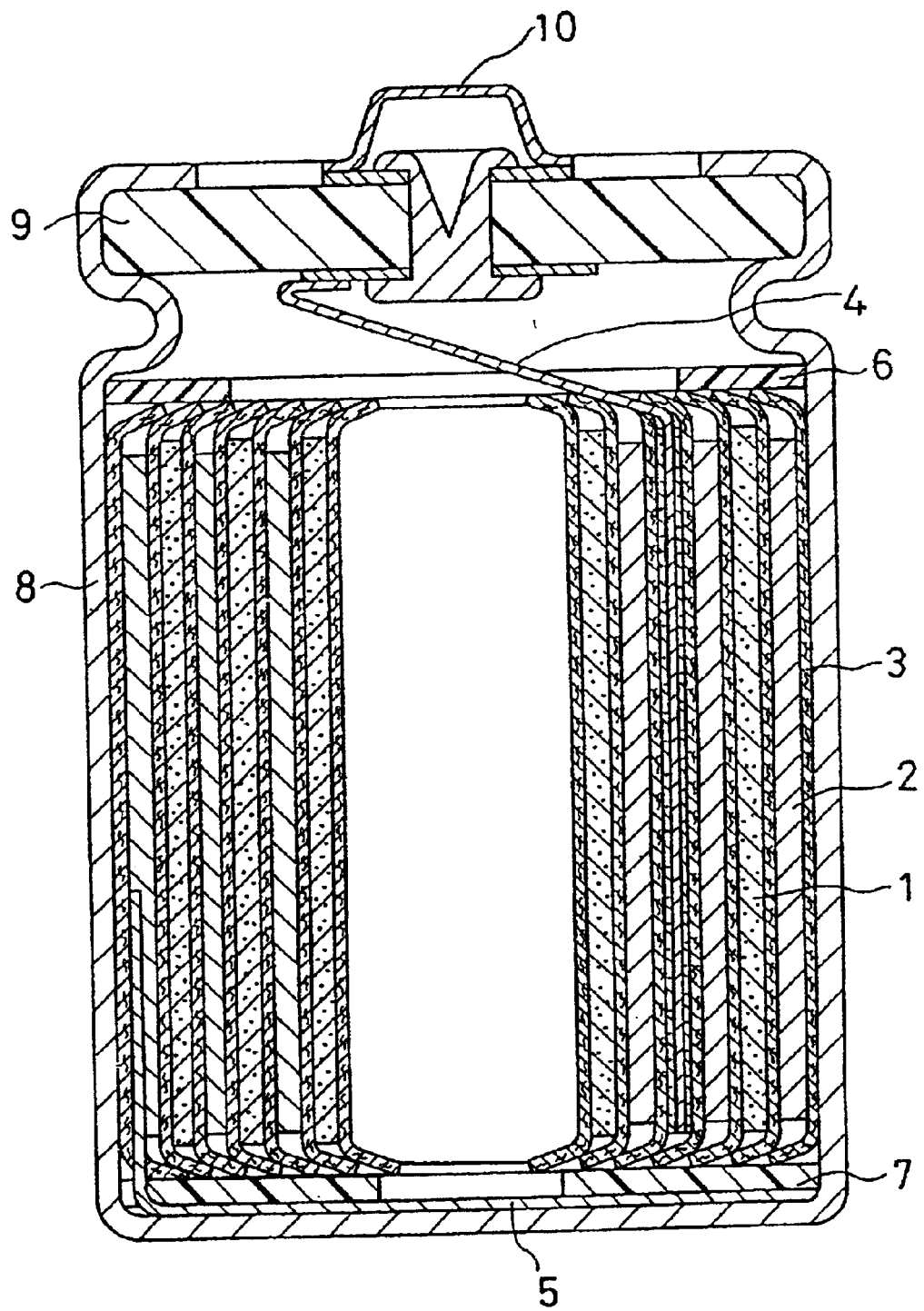
FIG. 1 shows the vertical cross sectional view of a cylindrical non-aqueous electrolyte secondary battery as an example of the non-aqueous electrolyte secondary battery of the present invention.

The non-aqueous electrolyte secondary battery of the present invention comprises a chargeable and dischargeable positive electrode, a non-aqueous electrolyte containing a lithium salt, and a chargeable and dischargeable negative electrode, and is characterized in that at least one of the positive electrode, the non-aqueous electrolyte and the negative electrode contains a specific phosphate.

The phosphate can be at least one selected from the group consisting of a phosphate represented by the general formula (1):

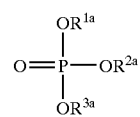

(1)

where $R^{1a}$, $R^{2a}$ and $R^{3a}$ independently represent an aliphatic hydrocarbon group having 7 to 12 carbon atoms, a phosphate represented by the general formula (2):

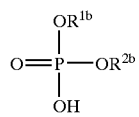

(2)

where $R^{1b}$ and $R^{2b}$ independently represent an aliphatic hydrocarbon group having 1 to 12 carbon atoms or an aromatic hydrocarbon group, and a phosphate represented by the general formula (3):

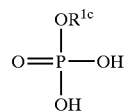

(3)

where $R^{1c}$ represents an aliphatic hydrocarbon group having 1 to 12 carbon atoms or an aromatic hydrocarbon group.

In the general formula (1), $R^{1a}$, $R^{2a}$ and $R^{3a}$ include linear aliphatic hydrocarbon groups such as heptyl group, octyl group, nonyl group, decyl group, undecyl group, and dodecyl group; aliphatic hydrocarbon groups having a side chain such as 2-methylhexyl group and 2-ethylhexyl group; and an alicyclic aliphatic hydrocarbon group. It is particularly preferable that $R^{1a}$, $R^{2a}$ and $R^{3a}$ are linear aliphatic hydrocarbon groups. In addition, it is preferable that at least two of $R^{1a}$, $R^{2a}$ and $R^{3a}$ are identical with each other, and it is further preferable that three of them are identical with each other.

The phosphate represented by the general formula (1) can be, for example, triheptyl phosphate, trioctyl phosphate, trinonyl phosphate, tridecyl phosphate, triundecyl phosphate, tridodecyl phosphate, or tri-2-ethylhexyl phosphate. These can be used solely, or two or more of them can be combined.

In the general formula (2), $R^{1b}$ and $R^{2b}$ include linear aliphatic hydrocarbon groups such as methyl group, ethyl group, propyl group, butyl group, pentyl group, hexyl group, heptyl group, octyl group, nonyl group, decyl group, undecyl group, and dodecyl group; aliphatic hydrocarbon groups having a side chain such as isopropyl group, tert-butyl group, 2-methylhexyl group and 2-ethylhexyl group; an alicyclic aliphatic hydrocarbon group; and aromatic hydrocarbon groups such as phenyl group and tolyl group. It is preferable that $R^{1b}$ and $R^{2b}$ have 4 to 12 carbon atoms, and it is further preferable that $R^{1b}$ and $R^{2b}$ are identical with each other.

The phosphate represented by the general formula (2) can be, for example, dimethyl phosphate, diethyl phosphate, dipropyl phosphate, dibutyl phosphate, dipentyl phosphate, dihexyl phosphate, diheptyl phosphate, dioctyl phosphate, dinonyl phosphate, didecyl phosphate, diundecyl phosphate, didodecyl phosphate, diphenyl phosphate, methylhexyl phosphate, ethylhexyl phosphate, propylhexyl phosphate, butylhexyl phosphate, pentylhexyl phosphate, heptylhexyl phosphate, octylhexyl phosphate, nonylhexyl phosphate, decylhexyl phosphate, undecylhexyl phosphate, dodecylhexyl phosphate, phenylhexyl phosphate, diisopropyl phosphate, or isopropylhexyl phosphate. These can be used solely, or two or more of them can be combined.

Among these, it is preferable to use dibutyl phosphate, dipentyl phosphate, dihexyl phosphate, diheptyl phosphate, dioctyl phosphate, dinonyl phosphate, didecyl phosphate, diundecyl phosphate, didodecyl phosphate, pentylhexyl phosphate, heptylhexyl phosphate, octylhexyl phosphate, nonylhexyl phosphate, decylhexyl phosphate, undecylhexyl phosphate, or dodecylhexyl phosphate.

It is further preferable to use dibutyl phosphate, dipentyl phosphate, dihexyl phosphate, diheptyl phosphate, dioctyl phosphate, dinonyl phosphate, didecyl phosphate, diundecyl phosphate, or didodecyl phosphate.

In the general formula (3), $R^{1c}$ can be those mentioned above as examples of $R^{1b}$ and $R^2$. It is preferred that $R^{1c}$ has 4 to 12 carbon atoms.

The phosphate represented by the general formula (3) can be, for example, monomethyl phosphate, monoethyl phosphate, monopropyl phosphate, monobutyl phosphate, monopentyl phosphate, monohexyl phosphate, monoheptyl phosphate, monooctyl phosphate, monononyl phosphate, monodecyl phosphate, monoundecyl phosphate, monododecyl phosphate or monophenyl phosphate. These can be used solely, or two or more of them can be combined.

Among them, it is further preferable to use monobutyl phosphate, monopentyl phosphate, monohexyl phosphate, monoheptyl phosphate, monooctyl phosphate, monononyl phosphate, monodecyl phosphate, monoundecyl phosphate, or monododecyl phosphate.

In addition, the phosphate represented by the general formula (2) is more preferable than the phosphate represented by the general formula (1), and the phosphate represented by the general formula (3) is more preferable than the phosphate represented by the general formula (2).

Furthermore, it is more preferable to use the mixture of the phosphates which are represented by different general formulae respectively than to solely use the phosphate represented by either one of the general formulae (1) to (3). Above all, it is most preferable to use the mixture of the phosphate represented by the general formula (3) and the phosphate represented by the general formula (2). In this case, it is preferable that $R^{1b}$, $R^{2b}$ and $R^{1c}$ have the same number of carbon atoms, and it is further preferable that they are of the same group.

It is preferable that the percentage by volume of each of the phosphates in the mixture is not less than 30% and it is further preferable that the percentage by volume of each of the phosphates in the mixture is approximately the same.

It is preferable that the non-aqueous electrolyte contains 0.1 to 20 wt %, and more preferably 0.5 to 5 wt % of the phosphate. When the weight ratio is less than 0.1 wt %, it becomes impossible to fully obtain the effect of suppressing the decomposition reaction and deterioration reaction of the non-aqueous electrolyte on the electrode. On the other hand, when the weight ratio exceeds 20 wt %, it is likely that the non-aqueous electrolyte loses its ion conductivity.

The non-aqueous electrolyte containing a lithium salt consists of a lithium salt and a solvent.

The solvent can be, for example, ethylene carbonate, propylene carbonate, butylene carbonate, dimethyl carbonate, diethyl carbonate, ethylmethyl carbonate, 1,2-dimethoxyethane, Y-butyrolactone, tetrahydrofuran, 2-methyltetrahydrofuran, dimethyl sulfoxide, dioxolan, 1,3-dioxolan, formamide, dimethylformamide, nitromethane, acetonitrile, methyl formate, methyl acetate, methyl propionate, trimethoxymethane, a dioxolan derivative, sulfolane, 3-methyl-2-oxazolidinon, a propylene carbonate derivative, a tetrahydrofuran derivative, diethyl ether, or 1,3-propanesultone. These can be used solely, or two or more of them can be combined. Above all, it is preferable that ethylene carbonate and propylene carbonate are used either solely or together.

The lithium salt can be $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium carboxylate having a lower aliphatic groups, $LiAlCl_4$, LiCl, LiBr, LiI, chloroborane lithium, or lithium 4-phenyl borate. The lithium salt also can be a sodium salt, a magnesium salt, an aluminum salt, a potassium salt, a rubidium salt, a calcium salt and so on.

As the chargeable and dischargeable positive electrode, it is possible to use a positive electrode which is obtained by applying a positive electrode mixture comprising a positive electrode active material, a conductive agent and a binder on a current collector plate.

As the positive electrode active material, it is preferable to use at least one selected from the group consisting of $LiCoO_2$, $LiMn_2O_4$, $LiNiO_2$ and $LiFeO_2$. These can be used solely, or two or more of them can be combined.

As the chargeable and dischargeable negative electrode, it is possible to use a negative electrode which is obtained by applying a negative electrode mixture comprising a negative electrode active material, a conductive agent and a binder on a current collector plate.

As the negative electrode active material, it is preferable to use at least one selected from the group consisting of a carbon material, metallic lithium, a lithium alloy, and a compound containing lithium. These can be used solely, or two or more of them can be combined.

As the lithium alloy, it is preferable to use a lithium-tin alloy or a lithium-silicon alloy. As the compound containing lithium, it is possible to use a lithium-tin oxide or a lithium-silicon oxide.

As the conductive agent, it is possible to use anything that does not badly affect the battery performance. For example, it is possible to use graphite, low-crystalline carbon, a carbon material containing an element such as B, P, N, S, H, or F.

As the binder, it is possible to use polyacrylic acid, carboxymethyl cellulose, polytetrafluoroethylene, poly (vinylidene fluoride), vinylidene fluoride-hexafluoro propylene copolymer, polyvinyl alcohol, starch, diacetyl cellulose, hydroxypropyl cellulose, polyvinyl chloride, polyvinyl pyrrolidone, polyethylene, polypropylene, styrene-butadiene copolymer (SBR), ethylene-propylene-diene copolymer (EPDM), sulphonated EPDM, fluorocarbon rubber, polybutadiene or poly(ethylene oxide). These can be used solely, or two or more of them can be combined. Among them, preferable ones are polyacrylic acid, carboxymethyl cellulose, poly(vinylidene fluoride), vinylidene fluoride-hexafluoro propylene copolymer, polytetrafluoroethylene, and SBR.

As the current collector plate for the positive electrode, it is possible to use aluminum, stainless steel, nickel, titanium, and their alloys. Their preferable forms are a foil, an expanded metal, a punched metal, a net, a mesh or the like. Above all, an aluminum foil is most preferable as the current collector plate for the positive electrode.

As the current collector plate for the negative electrode, it is possible to use copper, stainless steel, nickel, titanium, and their alloys. Their preferable forms are the same as those of the positive electrode. Above all, a copper foil is most preferable as the current collector for the negative electrode.

As a method for making the positive electrode and/or the negative electrode contain the phosphate, the following methods 1–3 are preferable.

Method 1 is to add the phosphate to the active material. In this method, the phosphate can be directly mixed with the active material. Alternatively, the active material can be immersed in a solution containing the phosphate. The latter is more preferable than the former in that the phosphate can be uniformly mixed with the active material.

In Method 1, it is preferable that 0.01 to 10 parts by weight, and more preferably 0.1 to 1.0 parts by weight of the phosphate is added to 100 parts by weight of the active material.

When the active material is immersed in the solution containing the phosphate, it is preferable that the solution contains 0.1 to 20 wt %, and more preferably 0.5 to 10 wt % of the phosphate. The solvent to dissolve the phosphate can be n-hexane, n-heptane, cyclohexane and so on.

The proper amount of the solution to immerse the 100 parts by weight of the active material is 100 to 500 parts by weight. Also, the proper imersion time is 1 minute to 12 hours. The active material after the immersion is used after being dried.

Method 2 is to add a phosphate to an electrode mixture comprising an active material, a conductive agent and a binder. In this method, when the electrode mixture is produced, the phosphate is mixed together with the other materials. In order to make the mixing easier, a proper amount of solvent such as N-methylpyrrolidone can be added to the mixture. The electrode mixture preferably contains 0.1 to 20 wt %, and more preferably 0.5 to 10 wt % of the phosphate.

Method 3 is to add the phosphate to the electrode which is obtained by applying an electrode mixture on the current collector plate. In this method, the electrode can be immersed either in a phosphate or a solution containing a phosphate.

When the electrode is immersed in the phosphate, it is preferable to immerse it for 1 to 6.0 seconds. When the electrode is immersed in the solution containing the phosphate, the same solution as is used in Method 1 to immerse the active material can be used. The proper immersion time is 1 minute to 12 hours. The electrode after the immersion is used after being dried.

FIG. 1 shows the vertical cross sectional view of a cylindrical non-aqueous electrolyte secondary battery as an example of the non-aqueous electrolyte secondary battery of the present invention. This battery is comprising an electrode assembly and a battery container 8.

The electrode assembly comprises a positive electrode plate 1, a negative electrode plate 2 and a belt-shaped micro porous polypropylene separator 3 having a larger width than these electrode plates. The positive electrode plate 1 includes a positive electrode lead plate 4 which is made from the same material as the core thereof and attached by spot welding. The negative electrode plate 2 includes a negative electrode lead plate 5 which is made from the same material as the core thereof and attached by spot welding. The laminated member consisting of the positive electrode plate 1, the negative electrode plate 2 and the separator 3 arranged therebetween are coiled. Furthermore, insulator plates 6 and 7 made of polypropylene are arranged on and beneath the electrode assembly, respectively.

After the electrode assembly is inserted in the battery container 8 a step is formed at the upper portion of the battery container 8. Then, a non-aqueous electrolyte is poured into the battery container 8. After this, a charge/discharge cycle is conducted once while the opening of the battery container 8 is left open so as to release generated gas. Later, the opening is sealed with a sealing plate 9 having a positive electrode terminal 10.

The present invention will be described specifically based on examples. It must be noted that the present invention is not restricted to these examples.

First, a method for evaluating batteries produced in the examples and comparative examples will be described.

Charge/Discharge Cycle Test

A charge/discharge cycle in which a battery was charged until 4.2 volts and discharged until 3 volts was repeated at 20° C. and a constant current of 50 mA. Then, the discharge capacity at the 1st cycle and the discharge capacity at the 100th cycle were measured. Then, the capacity maintenance rate at the 100th cycle was found from the formula:

the capacity maintenance rate (%) at the 100th cycle=100×(the discharge capacity at the 100th cycle/the discharge capacity at the 1st cycle).

High-Temperature Storage Test

A charge/discharge cycle in which a battery was charged until 4.2 volts and discharged until 3 volts was repeated at 20° C. and a constant current of 50 mA. Then, after the 11th charge, the battery was stored for one week at 85° C. Then, when the temperature of the stored battery became 20° C., it was discharged until 3 V. Then, the discharge capacity at that moment, that is, the discharge capacity at the 11th cycle was measured. Later, the charge/discharge cycle was conducted one more time to measure the discharge capacity at the 12th cycle. Then, the capacity maintenance rate (%) after being stored at high temperatures was found from the formula:

the capacity maintenance rate (%) after high-temperature storage= 100×(the discharge capacity at the 11th cycle/the discharge capacity at the 10th cycle).

In addition, the capacity restoration rate was found from the formula:

the capacity restoration rate (%)=100×(the discharge capacity at the 12th cycle/the discharge capacity at the 10th cycle).

EXAMPLES 1–6

A pasty negative electrode mixture was obtained by mixing 100 g of carbon power as a negative electrode active material, 5 g of styrene-butadiene rubber as a binder, and a proper amount of petroleum solvent. This was applied on a copper core (current collector plate), dried at 120° C., rolled out, and cut so as to obtain a negative electrode. This negative electrode contained 2.5 g of carbon powder. The discharge capacity of the carbon powder was 350 mAh per gram.

Then, lithium carbonate and cobalt carbonate were mixed in a predetermined mole ratio, heated at 900° C. so as to obtain $LiCoO_2$, which is a positive electrode active material. A pasty positive electrode mixture was obtained by mixing 100 g of $LiCoO_2$ which is sieved out into 100 mesh or less, 5 g of carbon powder as a conductive agent, 8 g of polytetrafluoroethylene as a binder, and a proper amount of petroleum solvent. This was applied on a titanium core (current collector plate), dried, rolled out, and cut so as to obtain a positive electrode. This positive electrode contained 5 g of positive electrode active material.

Then, a mixed solvent comprising ethylene carbonate and diethyl carbonate in the same percentage by volume was prepared. Then, lithium perchlorate was dissolved in the mixed solvent. The concentration of the lithium perchlorate was 1 mol/liter. The phosphates shown in Table 1 were added to it so as to obtain various non-aqueous electrolytes each containing 3 wt % of phosphate.

By using the negative electrode, the positive electrode and the non-aqueous electrolyte, the cylindrical non-aqueous electrolyte secondary battery shown in FIG. 1 was assembled. In the battery, 2.6 ml of the non-aqueous electrolyte was poured.

The results of the charge/discharge cycle test and high-temperature storage test of the batteries are shown in Table 1.

Comparative Example 1

The same operations as in Example 1 were conducted except that no phosphate was added to the non-aqueous electrolyte. The results of the charge/discharge cycle test and the high-temperature storage test were shown in Table 1.

Symbols used in Tables 1 to 9 hereinafter given have the following meanings.

*a type of phosphate

*b capacity maintenance rate (%) at the 100th cycle

*c capacity maintenance rate (%) after high-temperature storage

*d capacity restoration rate (%)

TABLE 1

| Example No. | *a | *b | *c | *d |
|---|---|---|---|---|
| 1 | Triheptyl phosphate | 81 | 84 | 83 |
| 2 | Trioctyl phosphate | 82 | 85 | 84 |
| 3 | Trinonyl phosphate | 80 | 84 | 83 |
| 4 | Tridecyl phosphate | 81 | 83 | 83 |
| 5 | Triundecyl phosphate | 81 | 84 | 83 |
| 6 | Tridodecyl phosphate | 80 | 83 | 84 |
| Comparative Example 1 | — | 51 | 60 | 65 |

As shown in Table 1, the batteries in which a non-aqueous electrolyte is added with a phosphate having the three identical aliphatic hydrocarbon groups have been drastically improved in the capacity maintenance rate at the 100th cycle, the capacity maintenance rate after high-temperature storage, and the capacity restoration rate, compared with the battery in which no phosphate is added to the non-aqueous electrolyte. From this, it is understood that the phosphates have the effect of reducing a decrease in capacity.

It is considered that the phosphates are adsorbed on the surface of the electrode, and it is also considered that the phosphates restrict the reaction between the non-aqueous electrolyte and the charged electrode. It is further considered that the addition of the phosphates has improved the electrochemical stability of the non-aqueous electrolyte.

Moreover, it has been found that when the aliphatic hydrocarbon groups have 7 to 12 carbon atoms, similar effects can be obtained regardless of their type.

In addition, the same operations as in Example 1 were conducted by using various phosphates each having three aliphatic hydrocarbon groups all of which are not identical. The results were far better than in Comparative Example 1.

Comparative Examples 2–5

The same operations as in Example 1 were conducted except that the phosphates shown in Table 2 were used in place of the phosphates shown in Table 1. The results of the charge/discharge cycle test and the high-temperature storage test are shown in Table 2.

TABLE 2

| Comparative Example No. | *a | *b | *c | *d |
|---|---|---|---|---|
| 2 | Trimethyl phosphate | 52 | 59 | 66 |
| 3 | Triethyl phosphate | 53 | 58 | 67 |
| 4 | Trihexyl phosphate | 52 | 58 | 66 |
| 5 | Tri-tridecane phosphate | 51 | 57 | 62 |

As shown in Table 2, it is understood that when the aliphatic hydrocarbon groups have 1 to 6 or 13 carbon atoms, even if the phosphate having three aliphatic hydrocarbon groups is used, the battery performance cannot be fully improved.

EXAMPLES 7–19

The same operations as in Example 1 were conducted except that the phosphates shown in Table 3 were used in place of the phosphates shown in Table 1. The results of the charge/discharge cycle test and the high-temperature storage test are shown in Table 3.

TABLE 3

| Example No. | *a | *b | *c | *d |
|---|---|---|---|---|
| 7 | Dimethyl phosphate | 74 | 85 | 85 |
| 8 | Diethyl phosphate | 76 | 84 | 83 |
| 9 | Dipropyl phosphate | 78 | 84 | 87 |
| 10 | Dibutyl phosphate | 79 | 84 | 89 |
| 11 | Dipentyl phosphate | 81 | 85 | 88 |
| 12 | Dihexyl phosphate | 84 | 88 | 91 |
| 13 | Diheptyl phosphate | 73 | 89 | 91 |
| 14 | Dioctyl phosphate | 83 | 89 | 90 |
| 15 | Dinonyl phosphate | 82 | 89 | 91 |
| 16 | Didecyl phosphate | 83 | 88 | 92 |
| 17 | Diundecyl phosphate | 83 | 89 | 92 |
| 18 | Didodecyl phosphate | 83 | 87 | 91 |
| 19 | Diphenyl phosphate | 83 | 82 | 87 |
| Comparative Example 1 | — | 51 | 60 | 65 |

EXAMPLES 20–31

The same operations as in Example 1 were conducted except that the phosphates shown in Table 4 were used in place of the phosphates shown in Table 1. The results of the charge/discharge cycle test and the high-temperature storage test shown in Table 4.

TABLE 4

| Example No. | *a | *b | *c | *d |
|---|---|---|---|---|
| 20 | Methylhexyl phosphate | 73 | 83 | 87 |
| 21 | Ethylhexyl phosphate | 72 | 83 | 86 |
| 22 | Propylhexyl phosphate | 77 | 85 | 87 |
| 23 | Butylhexyl phosphate | 79 | 86 | 87 |
| 24 | Pentylhexyl phosphate | 78 | 86 | 89 |
| 25 | Heptylhexyl phosphate | 79 | 89 | 91 |
| 26 | Octylhexyl phosphate | 79 | 88 | 90 |
| 27 | Nonylhexyl phosphate | 79 | 87 | 91 |
| 28 | Decylhexyl phosphate | 78 | 87 | 92 |
| 29 | Undecylhexyl phosphate | 78 | 85 | 90 |
| 30 | Dodecylhexyl phosphate | 77 | 87 | 91 |
| 31 | Phenylhexyl phosphate | 77 | 84 | 88 |
| Comparative Example 1 | — | 51 | 60 | 65 |

As shown in Tables 3 and 4, the batteries in which a non-aqueous electrolyte is added with a phosphate having two hydrocarbon groups have been drastically improved in the capacity maintenance rate at the 100th cycle, the capacity maintenance rate after high-temperature storage, and the capacity restoration rate, compared with the battery of Comparative Example 1. Above all, the case where the two hydrocarbon groups both have 4 to 10 carbon atoms is particularly excellent. In addition, the case where the phosphate having two hydrocarbon groups is used is more excellent than the case where the phosphate having three hydrocarbon groups is used. Furthermore, the case where the phosphate having identical hydrocarbon groups with each other is used is more excellent than the case where the phosphate having different hydrocarbon groups from each other is used.

EXAMPLES 32–44

The same operations as in Example 1 were conducted except that the phosphates shown in Table 5 were used in place of the phosphates shown in Table 1. The results of the charge/discharge cycle test and the high-temperature storage test are shown Table 5.

TABLE 5

| Example No. | *a | *b | *c | *d |
|---|---|---|---|---|
| 32 | Monomethyl phosphate | 75 | 85 | 89 |
| 33 | Monoethyl phosphate | 74 | 85 | 88 |
| 34 | Monopropyl phosphate | 79 | 88 | 89 |
| 35 | Monobutyl phosphate | 81 | 87 | 89 |
| 36 | Monopentyl phosphate | 82 | 87 | 91 |
| 37 | Monohexyl phosphate | 87 | 89 | 93 |
| 38 | Monoheptyl phosphate | 83 | 88 | 93 |
| 39 | Monooctyl phosphate | 84 | 88 | 92 |
| 40 | Monononyl phosphate | 84 | 88 | 93 |
| 41 | Monodecyl phosphate | 84 | 86 | 93 |
| 42 | Monoundecyl phosphate | 84 | 85 | 92 |
| 43 | Monododecyl phosphate | 85 | 87 | 92 |
| 44 | Monophenyl phosphate | 81 | 81 | 85 |
| Comparative Example 1 | — | 51 | 60 | 65 |

As shown in Table 5, the batteries in which a non-aqueous electrolyte is added with a phosphate having one hydrocarbon group have been drastically improved in the capacity maintenance rate at the 100th cycle, the capacity maintenance rate after high-temperature storage, and the capacity restoration rate, compared with the battery of Comparative Example 1. Above all, the cases where the hydrocarbon group has 4 to 10 carbon atoms are particularly excellent. In addition, the cases where the phosphate having one hydrocarbon group is used is more excellent than the cases where the phosphate having two hydrocarbon groups is used.

EXAMPLES 45–57

The same operations as in Example 1 were conducted except that the phosphate mixtures shown in Table 6 were used in place of the phosphates shown in Table 1. The results of the charge/discharge cycle test and the high-temperature storage test are shown in Table 6.

Each of the phosphate mixtures is a mixture of a phosphate having one hydrocarbon group and a phosphate having two hydrocarbon groups in the same percentage by volume. The hydrocarbon groups in both phosphates are the same with each other in all cases.

TABLE 6

| Example No. | *a | *b | *c | *d |
|---|---|---|---|---|
| 45 | Monomethyl phosphate/Dimethyl phosphate | 80 | 89 | 94 |
| 46 | Monoethyl phosphate/Diethyl phosphate | 82 | 89 | 93 |
| 47 | Monopropyl phosphate/Dipropyl phosphate | 85 | 91 | 94 |
| 48 | Monobutyl phosphate/Dibutyl phosphate | 87 | 91 | 94 |
| 49 | Monopentyl phosphate/Dipentyl phosphate | 89 | 91 | 96 |
| 50 | Monohexyl phosphate/Dihexyl phosphate | 90 | 95 | 98 |
| 51 | Monoheptyl phosphate/Diheptyl phosphate | 90 | 93 | 96 |
| 52 | Monooctyl phosphate/Dioctyl phosphate | 90 | 93 | 96 |
| 53 | Monononyl phosphate/Dinonyl phosphate | 90 | 92 | 95 |
| 54 | Monodecyl phosphate/Didecyl phosphate | 89 | 94 | 95 |
| 55 | Monoundecyl phosphate/Diundecyl phosphate | 88 | 93 | 95 |
| 56 | Monododecyl phosphate/Didodecyl phosphate | 89 | 93 | 96 |
| 57 | Monophenyl phosphate/Diphenyl phosphate | 87 | 88 | 91 |
| Comparative Example 1 | — | 51 | 60 | 65 |

As shown in Table 6, the batteries in which a non-aqueous electrolyte is added with a phosphate mixture have been drastically improved in the capacity maintenance rate at the 100th cycle, the capacity maintenance rate after high-temperature storage, and the capacity restoration rate, compared with the battery of Comparative Example 1. Above all, the cases where the hydrocarbon groups have 4 to 10 carbon atoms are particularly excellent. In addition, the cases where a phosphate mixtures is used are more excellent than the cases where a phosphate having one hydrocarbon group or a phosphate having two hydrocarbon groups are used solely.

EXAMPLES 58–65

The same operations as in Example 1 were conducted except that the weight ratio of monohexyl phosphate in the non-aqueous electrolyte was varied in the range of 0.01 to 30 wt %. The results of the charge/discharge cycle test and the high-temperature storage test are shown in Table 7.

TABLE 7

| Example No. | weight ratio (wt %) of monohexyl phosphate | *b | *c | *d |
|---|---|---|---|---|
| 58 | 0.01 | 52 | 60 | 64 |
| 59 | 0.1 | 75 | 80 | 89 |
| 60 | 0.5 | 88 | 87 | 90 |
| 61 | 1 | 89 | 87 | 91 |
| 62 | 5 | 91 | 90 | 94 |
| 63 | 10 | 88 | 91 | 93 |
| 64 | 20 | 87 | 90 | 93 |
| 65 | 30 | 55 | 60 | 67 |
| Comparative Example 1 | — | 51 | 60 | 65 |

As shown in Table 7, when monohexyl phosphate has a weight ratio of 0.1 to 20 wt % in the non-aqueous electrolyte, the capacity maintenance rate at the 100th cycle, the capacity maintenance rate after high-temperature storage, and the capacity restoration rate are particularly excellent. It is considered that when the weight ratio is less than 0.1 wt %, the effect of suppressing the reaction between the non-aqueous electrolyte and the charged electrode, and the effect of improving the electrochemical stability of the non-aqueous electrolyte are small. It is also considered that when the weight ratio is over 20 wt %, the non-aqueous electrolyte loses its ion conductivity and the like.

EXAMPLES 66–73

The same operations as in Examples 58 to 65 were conducted except that a mixture of monohexyl phosphate and dihexyl phosphate in the same percentage by volume was added in place of adding monohexyl phosphate. The results of the charge/discharge cycle test and the high-temperature storage test are shown in Table 8.

TABLE 8

| Example No. | weight ratio (wt %) of the mixture of monohexylphosphate/dihexyl phosphate | *b | *c | *d |
|---|---|---|---|---|
| 66 | 0.01 | 50 | 60 | 65 |
| 67 | 0.1 | 90 | 92 | 91 |
| 68 | 0.5 | 92 | 93 | 91 |
| 69 | 1 | 95 | 95 | 95 |
| 70 | 5 | 95 | 97 | 98 |
| 71 | 10 | 95 | 96 | 97 |
| 72 | 20 | 94 | 96 | 97 |
| 73 | 30 | 53 | 62 | 66 |
| Comparative Example 1 | — | 51 | 60 | 65 |

As shown in Table 8, in the cases where a phosphate mixture is used, when the weight ratio in the non-aqueous electrolyte is 0.1 to 20 wt %, the capacity maintenance rate at the 100th cycle, the capacity maintenance rate after high-temperature storage, and the capacity restoration rate are high. The cases where a phosphate mixture is used are more excellent than the cases where monohexyl phosphate is used solely.

EXAMPLE 74

0.5 g of monooctyl phosphate was added to 100 g of the positive electrode active material used in Example 1, and they were mixed for 10 minutes and dried for 1 hour at 110° C. Then, 100 g of this mixture, 4 g of carbon powder as a conductive agent, 4 g of poly(vinylidene fluoride) as a binder, and 30 g of N-methylpyrrolidone as a solvent were mixed for 15 minutes with a mixer so as to obtain a positive electrode mixture. This positive electrode mixture was applied on a 30 μm-thick aluminum core (current collector plate) by using a knife coater, dried for 10 minutes at 90° C., rolled out at 5000 kgf/cm$^2$, and further dried for 5 hours at 110° C. so as to obtain a positive electrode having a thickness of 100 μm.

100 g of carbon powder as a negative electrode active material, 5 g of styrene-butadiene rubber as a binder, and a proper amount of 80 g of petroleum solvent were mixed for 15 minutes with a mixer, so as to obtain a negative electrode mixture. Then, this negative electrode mixture was applied on a copper core (current collector plate), dried for 10 minutes at 110° C., rolled out, and further dried for 3 hours at 110° C. so as to obtain a negative electrode. The discharge capacity of the carbon powder was 350 mAh per gram.

Then, a mixed solvent comprising ethylene carbonate and diethyl carbonate in the same percentage by volume was prepared. Then, lithium hexafluorophosphate was dissolved in the mixture so as to obtain a non-aqueous electrolyte. The concentration of the lithium hexafluorophosphate was 1 mol/liter.

By using the negative electrode, the positive electrode and the non-aqueous electrolyte, the cylindrical non-aqueous electrolyte secondary battery shown in FIG. 1 was assembled. In the battery, 2.6 ml of the non-aqueous electrolyte was poured. The results of the charge/discharge cycle test and high-temperature storage test of the battery are shown in Table 9.

Comparative Example 6

The same operations as in Example 74 were conducted except that 0.5 g of monooctyl phosphate was not used in the manufacture of the positive electrode. The results of the charge/discharge cycle test and the high-temperature storage test are shown in Table 9.

EXAMPLE 75

100 g of the positive electrode active material used in Example 1 was immersed in an n-hexane solution containing 0.5 wt % of monooctyl phosphate, and stirred for 5 minutes. Later, it was dried for 1 hour at 110° C. Then, 100 g of the dried positive electrode active material, 4 g of carbon powder as a conductive agent, 4 g of poly(vinylidene fluoride) as a binder, and 30 g of N-methylpyrrolidone as a solvent were mixed for 15 minutes with a mixer so as to obtain a positive electrode mixture. This positive electrode mixture was applied on a 30 $\mu$m-thick aluminum core (current collector plate) by using a knife coater, dried for 10 minutes at 90° C., rolled out at 5000 kgf/cm$^2$, and further dried for 5 hours at 110° C. so as to obtain a positive electrode having a thickness of 100 $\mu$m.

By using the positive electrode, and the negative electrode and the non-aqueous electrolyte used in Example 74, a battery was assembled and evaluated. The results of the charge/discharge cycle test and high-temperature storage test of the battery are shown in Table 9.

EXAMPLE 76

100 g of the positive electrode active material used in Example 1, 4 g of carbon powder as a conductive agent, 4 g of poly(vinylidene fluoride) as a binder, 30 g of N-methylpyrrolidone as a solvent, and 0.5 g of dihexyl phosphate were mixed for 15 minutes with a mixer so as to obtain a positive electrode mixture. This positive electrode mixture was applied on a 30 $\mu$m-thick aluminum core (current collector plate) by using a knife coater, dried for 10 minutes at 90° C., rolled out at 5000 kgf/cm$^2$, and further dried for 5 hours at 110° C. so as to obtain a positive electrode having a thickness of 100 $\mu$m.

By using the positive electrode, and the negative electrode and the non-aqueous electrolyte used in Example 74, a battery was assembled and evaluated. The results of the charge/discharge cycle test and high-temperature storage test of the battery are shown in Table 9.

EXAMPLE 77

First, a mixture of monohexyl phosphate and dihexyl phosphate in the same percentage by volume was prepared. Then, an n-hexane solution containing 0.5 wt % of the mixture was prepared. The positive electrode used in Comparative Example 6 was immersed in the solution for 5 minutes, and dried for 3 hours at 110° C. By using the positive electrode, and the negative electrode and the non-aqueous electrolyte used in Example 74, a battery was assembled and evaluated. The results of the charge/discharge cycle test and the high-temperature storage test are shown in Table 9.

EXAMPLE 78

First, a mixture of monohexyl phosphate and dihexyl phosphate in the same percentage by volume was prepared. Then, the positive electrode used in Comparative Example 6 was immersed in the mixture for 30 seconds, and dried for 3 hours at 110° C. By using the positive electrode, and the negative electrode and the non-aqueous electrolyte used in Example 74, a battery was assembled and evaluated. The results of the charge/discharge cycle test and the high-temperature storage test are shown in Table 9.

EXAMPLE 79

100 g of carbon powder and 0.5 g of monoheptyl phosphate were mixed by a mixer for 5 minutes, and then dried for 1 hour at 110° C. 100 g of the dried carbon powder, 4 g of poly(vinylidene fluoride) as a binder, and 30 g of N-methylpyrrolidone as a solvent were mixed for 15 minutes with a mixer so as to obtain a negative electrode mixture. This negative electrode mixture was applied on a 16 $\mu$m-thick copper core (current collector plate) by using a knife coater, dried for 10 minutes at 90° C., rolled out at 4000 kgf/cm$^2$, and further dried for 5 hours at 110° C. so as to obtain a negative electrode having a thickness of 150 $\mu$m.

By using the negative electrode, and the positive electrode and the non-aqueous electrolyte used in Comparative Example 6, a battery was assembled and evaluated. The results of the charge/discharge cycle test and high-temperature storage test of the battery are shown in Table 9.

EXAMPLE 80

100 g of carbon powder was immersed in an n-hexane solution containing 1.0 wt % of monoheptyl phosphate and stirred for 5 minutes. Later, it was dried for 1 hour at 110° C. A battery was assembled in the same manner as in Example 79 except that this carbon powder was used, and evaluated. The results of the charge/discharge cycle test and high-temperature storage test of the battery are shown in Table 9.

EXAMPLE 81

100 g of carbon powder, 4 g of poly(vinylidene fluoride) as a binder, 30 g of N-methylpyrrolidone as a solvent, and 0.5 g of dihexyl phosphate were mixed for 15 minutes with a mixer so as to obtain a negative electrode mixture. This negative electrode mixture was applied on a 16 $\mu$m-thick copper core (current collector plate) by using a knife coater, dried for 10 minutes at 90° C., rolled out at 4000 kgf/cm$^2$, and further dried for 5 hours at 110° C. so as to obtain a negative electrode having a thickness of 150 $\mu$m.

By using the negative electrode, and the positive electrode and the non-aqueous electrolyte used in Comparative Example 6, a battery was assembled and evaluated. The results of the charge/discharge cycle test and high-temperature storage test of the battery are shown in Table 9.

EXAMPLE 82

The negative electrode used in Example 74 was immersed for 5 minutes in an n-hexane solution containing 1.0 wt % of monohexyl phosphate. Later, the negative electrode was dried for 3 hours at 110° C.

By using the negative electrode, and the positive electrode and the non-aqueous electrolyte used in Comparative Example 6, a battery was assembled and evaluated. The results of the charge/discharge cycle test and high-temperature storage test of the battery are shown in Table 9.

EXAMPLE 83

The negative electrode used in Example 74 was immersed for 30 seconds in monohexyl phosphate. Later, the negative electrode was dried for 3 hours at 110° C.

By using the negative electrode, and the positive electrode and the non-aqueous electrolyte used in Comparative Example 6, a battery was assembled and evaluated. The results of the charge/discharge cycle test and high-temperature storage test of the battery are shown in Table 9.

TABLE 9

| Example No. | *b | *c | *d |
|---|---|---|---|
| 74 | 80 | 90 | 92 |
| 75 | 82 | 92 | 96 |
| 76 | 83 | 93 | 95 |
| 77 | 85 | 95 | 97 |
| 78 | 82 | 94 | 95 |
| 79 | 78 | 92 | 96 |
| 80 | 80 | 92 | 93 |
| 81 | 79 | 90 | 91 |
| 82 | 82 | 92 | 94 |
| 83 | 80 | 89 | 91 |
| Comparative Example 6 | 53 | 62 | 66 |

As shown in Table 9, when a phosphate is added to either the active material, the electrode mixture, or the electrode, the capacity maintenance rate at the 100th cycle, the capacity maintenance rate after high-temperature storage, and the capacity restoration rate of the batteries become high. The reason for this is considered that the phosphate contained in either the active material, the electrode mixture, or the electrode suppresses the reaction between the non-aqueous electrolyte and the charged electrode.

Industrial Applicability

The non-aqueous electrolyte secondary battery of the present invention has a high-energy density, and shows a small decrease in the discharge capacity with the progress of the charge/discharge cycle, and minor deterioration of characteristics during high-temperature storage. Therefore, the present invention has a great industrial significance.

What is claimed is:

1. A non-aqueous electrolyte secondary battery comprising a chargeable and dischargeable positive electrode, a non-aqueous electrolyte containing a lithium salt, and a chargeable and dischargeable negative electrode, wherein at least one of the positive electrode, the non-aqueous electrolyte, and the negative electrode contains a mixture of two or three phosphates selected from the group consisting of:
a phosphate represented by formula (1):

(1)

wherein $R^{1a}$, $R^{2a}$, and $R^{3a}$ are independently selected from an aliphatic hydrocarbon group having seven to twelve carbon atoms;

a phosphate represented by formula (2):

(2)

wherein $R^{1b}$ and $R^{2b}$ are independently selected from an aliphatic hydrocarbon group having one to twelve carbon atoms or an aromatic hydrocarbon group; and
a phosphate represented by formula (3):

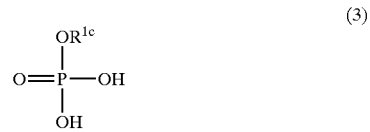

(3)

wherein $R^{1c}$ represents an aliphatic hydrocarbon group having one to twelve carbon atoms or an aromatic hydrocarbon group,
wherein the hydrocarbon $R^{1a}$, $R^{2a}$, $R^{3a}$, $R^{1b}$, $R^{2b}$ and $R^{1c}$ in the formulae (1), (2) and (3) have the same number of carbon atoms in the mixture and each phosphate in the mixture comprises not less than 30 volume % based on a total volume of the mixture.

2. The battery of claim 1, wherein one of the two or three phosphates of the mixture is selected from the group consisting of dibutyl phosphate, dipentyl phosphate, dihexyl phosphate, diheptyl phosphate, dioctyl phosphate, dinonyl phosphate, didecyl phosphate, diundecyl phosphate, didodecyl phosphate, monobutyl phosphate, monopentyl phosphate, monohexyl phosphate, monoheptyl phosphate, monooctyl phosphate, monononyl phosphate, monodecyl phosphate, monoundecyl phosphate, and monododecyl phosphate.

3. The battery of claim 1, wherein the non-aqueous electrolyte contains 0.1 to 20 wt % of the phosphate mixture.

4. The battery of claim 1, wherein the chargeable and dischargeable positive electrode contains at least one selected from the group consisting of $LiCoO_2$, $LiMn_2O_4$, $LiNiO_2$ and $LiFeO_2$, and the chargeable and dischargeable negative electrode contains at least one selected from the group consisting of a carbon material, a metallic lithium, a lithium alloy, and a compound containing lithium.

5. The battery of claim 1, wherein the mixture of two or three phosphates comprises a phosphate of formula (1) wherein $R^{1a}$, $R^{2a}$, and $R^{3a}$ are the same.

6. The battery of claim 1, wherein the mixture of two or three phosphates comprises a phosphate of formula (2), wherein $R^{1b}$ and $R^{2b}$ are the same.

7. The battery of claim 6, wherein the chargeable and dischargeable positive electrode contains at least one selected from the group consisting of LiCoO2, $LiMn_2O_2$, $LiNiO_2$ and $LiFeO_2$, and the chargeable and dischargeable negative electrode contains at least one selected from the group consisting of a carbon material, a metallic lithium, a lithium alloy and a compound containing lithium.

8. A method for producing a non-aqueous electrolyte secondary battery comprising:
preparing an electrode mixture comprising an active material, a conductive agent, and a binder,
applying the electrode mixture on a current collector plate to prepare an electrode,
assembling a non-aqueous electrolyte secondary battery using the electrode and a non-aqueous electrolyte and, adding to at least one of the active material, the electrode mixture, and the electrode a mixture of two or three phosphates selected from the group consisting of:

a phosphate represented by formula (1):

(1)

wherein $R^{1a}$, $R^{2a}$, and $R^{3a}$ independently represent an aliphatic hydrocarbon group having seven to twelve carbon atoms, a phosphate represented by formula (2):

(2)

wherein $R^{1b}$ and $R^2b$ independently represent an aliphatic hydrocarbon group having one to twelve carbon atoms or an aromatic hydrocarbon group; and a phosphate represented by formula (3):

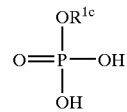

(3)

wherein $R^{1c}$ represents an aliphatic hydrocarbon group having one to twelve carbon atoms or an aromatic hydrocarbon group, wherein $R^{1a}$, $R^{2a}$, $R^{3a}$, $R^{1b}$, $R^{2b}$ and $R^{1c}$ in said formulae (1), (2), and (3) have the same number of carbon atoms in the mixture and each phosphate in the mixture comprises not less than 30 volume % based on a total volume of the mixture.

\* \* \* \* \*

UNITED STATES PATENT AND TRADEMARK OFFICE
CERTIFICATE OF CORRECTION

PATENT NO.    : 6,733,927 B1
DATED         : May 11, 2004
INVENTOR(S)   : Hideharu Takezawa et al.

It is certified that error appears in the above-identified patent and that said Letters Patent is hereby corrected as shown below:

<u>Title page, Item [54] and Column 1, line 3,</u>
Title, "MANUFACTURING" should read -- PRODUCING --;

<u>Column 20,</u>
Line 1, "$R^2b$" should read -- $R^{2b}$ --.

Signed and Sealed this

First Day of February, 2005

JON W. DUDAS
*Director of the United States Patent and Trademark Office*